US009245192B2

(12) United States Patent
Bamidele

(10) Patent No.: US 9,245,192 B2
(45) Date of Patent: Jan. 26, 2016

(54) AD COLLATERAL DETECTION

(71) Applicant: HERE Global B.V., Veldhoven (NL)

(72) Inventor: Adetokunbo Bamidele, Dublin, CA (US)

(73) Assignee: HERE Global B.V., Veldhoven (NL)

( * ) Notice: Subject to any disclaimer, the term of this patent is extended or adjusted under 35 U.S.C. 154(b) by 159 days.

(21) Appl. No.: 14/032,399

(22) Filed: Sep. 20, 2013

(65) Prior Publication Data

US 2015/0085154 A1 Mar. 26, 2015

(51) Int. Cl.
*G06K 9/20* (2006.01)
*G06K 9/32* (2006.01)
*H04N 5/232* (2006.01)

(52) U.S. Cl.
CPC .............. *G06K 9/2081* (2013.01); *G06K 9/325* (2013.01); *G06K 9/3233* (2013.01); *H04N 5/23293* (2013.01)

(58) Field of Classification Search
None
See application file for complete search history.

(56) References Cited

U.S. PATENT DOCUMENTS

| 7,023,475 | B2 * | 4/2006 | Bean et al. | 348/207.99 |
|---|---|---|---|---|
| 7,455,232 | B2 * | 11/2008 | Epshteyn | 235/462.11 |
| 7,680,324 | B2 * | 3/2010 | Boncyk et al. | 382/165 |
| 7,734,729 | B2 * | 6/2010 | Du et al. | 709/219 |
| 7,751,805 | B2 * | 7/2010 | Neven et al. | 455/414.3 |
| 8,156,115 | B1 * | 4/2012 | Erol et al. | 707/728 |
| 8,243,145 | B2 * | 8/2012 | Tsuchiya | 348/207.1 |
| 8,301,159 | B2 * | 10/2012 | Hamynen et al. | 455/456.1 |
| 8,400,548 | B2 * | 3/2013 | Bilbrey et al. | 348/333.01 |
| 8,413,903 | B1 * | 4/2013 | Dhua et al. | 235/462.25 |
| 8,483,715 | B2 * | 7/2013 | Chen | 455/456.3 |
| 8,582,821 | B1 * | 11/2013 | Feldman et al. | 382/107 |
| 8,587,680 | B2 * | 11/2013 | Okumura et al. | 348/211.4 |
| 8,639,036 | B1 * | 1/2014 | Singer et al. | 382/200 |
| 8,687,104 | B2 * | 4/2014 | Penov et al. | 348/333.03 |
| 8,706,572 | B1 * | 4/2014 | Varadarajan | 705/27.2 |
| 8,718,369 | B1 * | 5/2014 | Tompkins et al. | 382/181 |
| 8,737,737 | B1 * | 5/2014 | Feldman et al. | 382/170 |
| 8,743,145 | B1 * | 6/2014 | Price | 345/633 |
| 8,818,274 | B2 * | 8/2014 | Grob et al. | 455/41.2 |
| 8,879,639 | B2 * | 11/2014 | Sauerwein, Jr. | 375/240.25 |
| 8,886,172 | B2 * | 11/2014 | Gomez | 455/414.3 |
| 8,994,851 | B2 * | 3/2015 | Varanasi | 348/231.3 |
| 9,014,480 | B2 * | 4/2015 | Baheti et al. | 382/198 |

(Continued)

FOREIGN PATENT DOCUMENTS

WO WO 2012/166577 A1 12/2012

OTHER PUBLICATIONS

"Scale-invariant feature transform", http://en.wikipedia.org/wiki/Scale-invariant_feature_transform, (Aug. 14, 2013), (pp. 1-17).

(Continued)

*Primary Examiner* — Aung S Moe
(74) *Attorney, Agent, or Firm* — Harrington & Smith

(57) ABSTRACT

A method including transmitting an image from a camera of an apparatus, where the image includes one or more Ad collateral; and automatically detecting by the apparatus at least one of the Ad collateral in the image. An apparatus including at least one processor; and at least one memory including computer program code, the at least one memory and the computer program code configured to, with the at least one processor, cause the apparatus at least to automatically discern at least one Ad collateral in a camera image.

20 Claims, 8 Drawing Sheets

(56) References Cited

U.S. PATENT DOCUMENTS

| | | | |
|---|---|---|---|
| 2002/0081033 A1 | 6/2002 | Stentiford | 382/218 |
| 2004/0264776 A1* | 12/2004 | Wu et al. | 382/190 |
| 2005/0169535 A1 | 8/2005 | Stentiford | 382/218 |
| 2006/0050993 A1 | 3/2006 | Stentiford | 382/305 |
| 2006/0179453 A1* | 8/2006 | Kadie et al. | 725/34 |
| 2006/0190812 A1* | 8/2006 | Ellenby et al. | 715/512 |
| 2007/0116354 A1 | 5/2007 | Stentiford | 382/166 |
| 2007/0175998 A1* | 8/2007 | Lev | 235/454 |
| 2007/0250901 A1* | 10/2007 | McIntire et al. | 725/146 |
| 2007/0286317 A1 | 12/2007 | Stentiford et al. | 375/348 |
| 2008/0004978 A1* | 1/2008 | Rothschild | 705/26 |
| 2008/0069445 A1* | 3/2008 | Weber | 382/181 |
| 2008/0075372 A1 | 3/2008 | Stentiford | 382/218 |
| 2008/0187112 A1 | 8/2008 | Koberstein et al. | 379/88.17 |
| 2008/0189391 A1 | 8/2008 | Koberstein et al. | 709/218 |
| 2008/0195458 A1* | 8/2008 | Anschutz et al. | 705/10 |
| 2008/0205760 A1 | 8/2008 | Stentiford | 382/181 |
| 2009/0125510 A1* | 5/2009 | Graham et al. | 707/5 |
| 2009/0197616 A1* | 8/2009 | Lewis et al. | 455/456.1 |
| 2009/0252421 A1 | 10/2009 | Stentiford | 382/209 |
| 2010/0046842 A1* | 2/2010 | Conwell | 382/218 |
| 2010/0257252 A1* | 10/2010 | Dougherty et al. | 709/217 |
| 2010/0328496 A1* | 12/2010 | Pozniansky et al. | 348/231.99 |
| 2011/0145068 A1* | 6/2011 | King et al. | 705/14.55 |
| 2011/0178871 A1* | 7/2011 | Watfa et al. | 705/14.53 |
| 2011/0202397 A1 | 8/2011 | Lam et al. | 705/14.5 |
| 2011/0285873 A1* | 11/2011 | Showering | 348/231.99 |
| 2011/0300902 A1* | 12/2011 | Kwon | 455/556.1 |
| 2012/0092329 A1* | 4/2012 | Koo et al. | 345/419 |
| 2012/0155754 A1* | 6/2012 | Chen et al. | 382/164 |
| 2012/0166435 A1* | 6/2012 | Graham et al. | 707/728 |
| 2012/0299961 A1* | 11/2012 | Ramkumar et al. | 345/632 |
| 2013/0044959 A1* | 2/2013 | Mitchell et al. | 382/217 |
| 2013/0058575 A1* | 3/2013 | Koo et al. | 382/176 |
| 2013/0073583 A1* | 3/2013 | Licata et al. | 707/769 |
| 2013/0124326 A1* | 5/2013 | Huang et al. | 705/14.64 |
| 2013/0147970 A1* | 6/2013 | Herring et al. | 348/207.1 |
| 2013/0195376 A1* | 8/2013 | Baheti et al. | 382/289 |
| 2013/0329023 A1* | 12/2013 | Suplee et al. | 348/61 |
| 2014/0003723 A1* | 1/2014 | Lu et al. | 382/182 |
| 2014/0008428 A1* | 1/2014 | Na | 235/375 |
| 2014/0018097 A1* | 1/2014 | Goldstein | 455/456.1 |
| 2014/0023270 A1* | 1/2014 | Baheti et al. | 382/171 |
| 2014/0086483 A1* | 3/2014 | Zhang et al. | 382/165 |
| 2014/0111542 A1* | 4/2014 | Wan | 345/633 |

OTHER PUBLICATIONS

John K. Tsotsos, "Computational Models of Visual Attention", Department of Computer Science & Engineering, and Center for Vision Research, York University, http://scholarpedia.org/article/Computational_Models_of_visual_attention, (Feb. 4, 2012), (pp. 1-18).

"Bottom-Up Visual Attention: Theory", Hedco Neuroscience Building, http://ilab.usc.edu/bu/theory/index.html, (2000), (pp. 1-4).

"Viola-Jones object detection framework", http://en.wikipedia.org/wiki/Viola%E2%80%93Jones_object_detection_framework, (Jul. 1, 2013), (pp. 1-3).

Simon E. Winder, "Pipelines for Image Matching and Recognition" Microsoft Research, (Feb. 2010), (7 pages).

Li, et al., "Detection of Static Salient Objects Based on Visual Attention and Edge Features", (Aug. 17, 2013), (4 pages).

\* cited by examiner

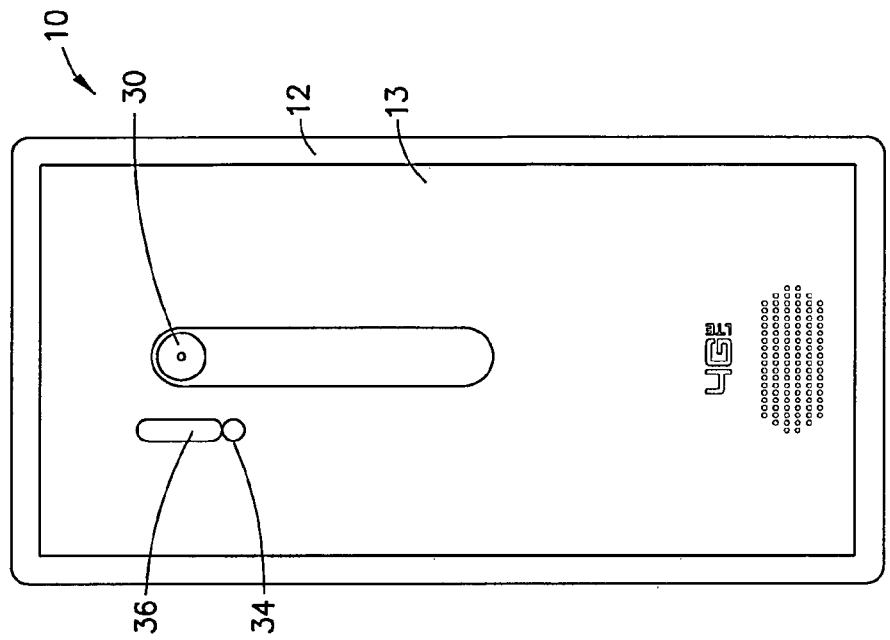
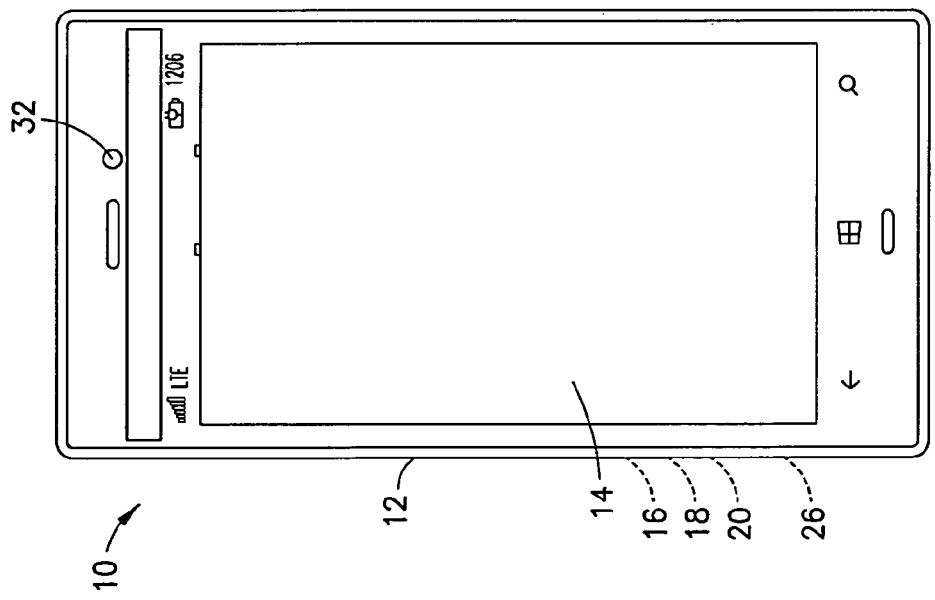

AD COLLATERAL DETECTION

BACKGROUND

1. Technical Field

The exemplary and non-limiting embodiments relate generally to a camera image and, more particularly, to detection of an item in a camera image.

2. Brief Description of Prior Developments

Advertising, in recent years, is separated into two categories: "paid media", which is the common definition of traditional advertising, and all other forms of non-media communications. Collateral advertising is one of several forms of non-media communications. Many marketers today use collateral advertising as their primary, sometimes only, means of advertising.

Advertising Collateral, also known as "Ad collateral", is an individual item of collateral advertising in an Ad campaign including, for example, a newspaper advertisement, a magazine advertisement, a custom folder, a brochure, a business mailer, a flyer, a marketing insert, a business card, a billboard and a poster. Ad collateral may be text, a combination of text and image(s) and perhaps also a bar code such as a QR code for example. "Ad collateral" always comprises more than merely a bar code, and will always comprise text and/or a non-bar code image.

Relating to digital imaging, recognition software, such as facial recognition software, is known.

SUMMARY

The following summary is merely intended to be exemplary. The summary is not intended to limit the scope of the claims.

In accordance with one aspect, a method comprises transmitting an image from a camera of an apparatus, where the image comprises one or more Ad collateral; and automatically detecting by the apparatus at least one of the Ad collateral in the image.

In accordance with another aspect, an apparatus comprises at least one processor; and at least one memory including computer program code, the at least one memory and the computer program code configured to, with the at least one processor, cause the apparatus at least to automatically discern at least one Ad collateral in a camera image.

In accordance with another aspect, a non-transitory program storage device readable by a machine is provided, tangibly embodying a program of instructions executable by the machine for performing operations, the operations comprising analyze an image from a camera, where the image comprises one or more Ad collateral; and automatically discern at least one of the Ad collateral in the image.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

DETAILED DESCRIPTION OF EMBODIMENTS

Figure 3:
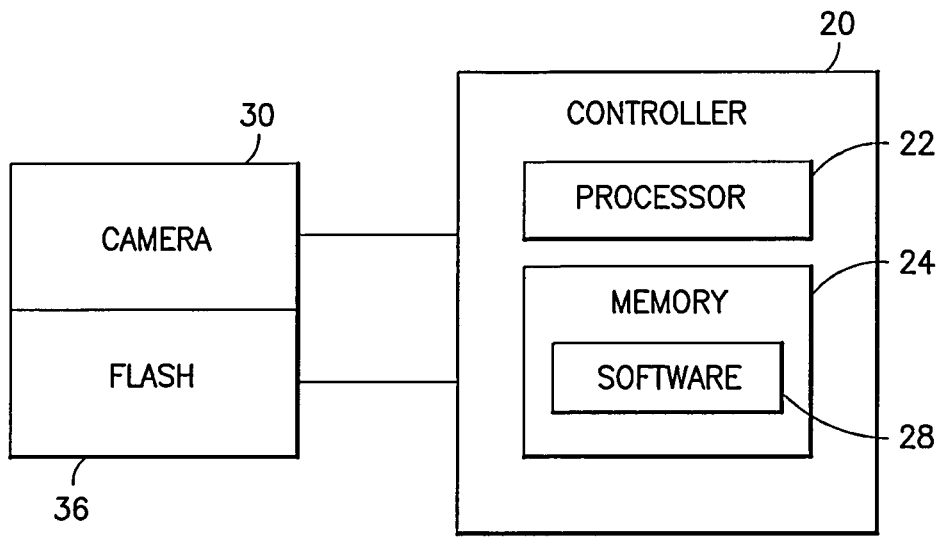
FIG. 3 is a diagram illustrating some of the components of the apparatus shown in FIGS. 1-2.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 4B:
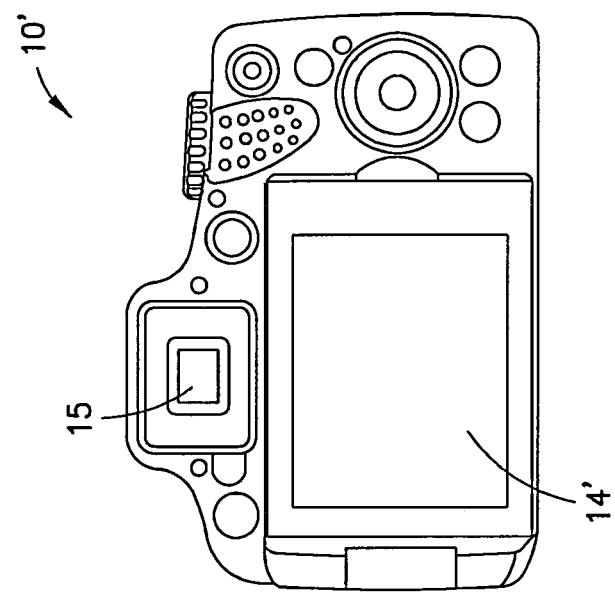
FIGS. 4A and 4B show an alternate embodiment of the apparatus shown in FIG. 1.
Figure 4A:
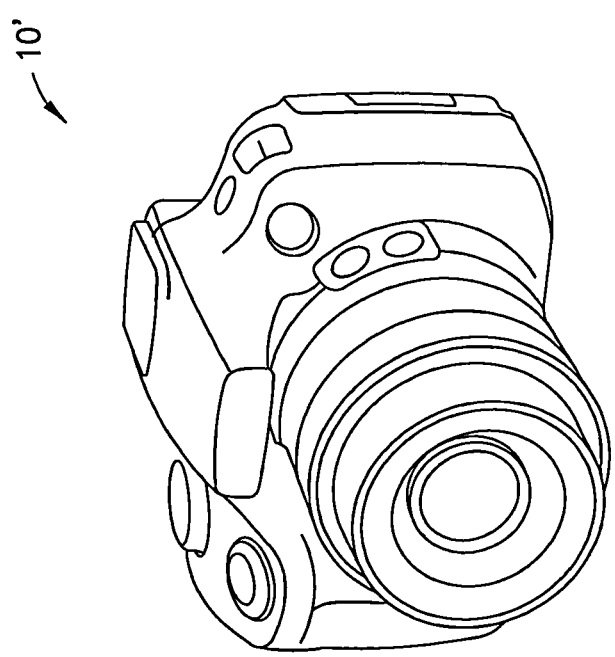

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone. For example, the apparatus might be a SLR type of camera such as the example camera 10' shown in FIGS. 4A-4B. In the example shown in FIGS. 4A-4B the camera 10' has both a viewfinder 15 and a display 14' (perhaps a touch screen display).

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) having components such as the controller 20 thereon. The receiver 16 and transmitter form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED and the flash system 36 are connected to the controller 20 such that the controller 20 may control their operation.

Figure 5:
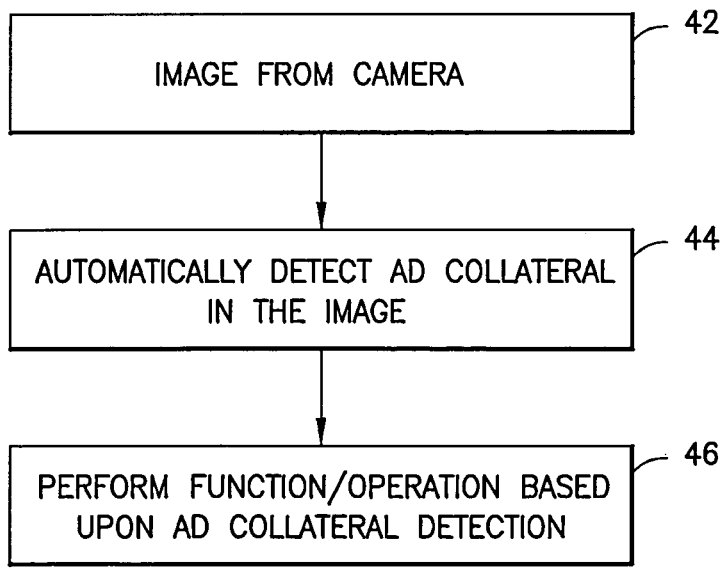
FIG. 5 is a diagram illustration some steps of an example method.

Referring also to FIG. 5, the apparatus 10 is configured to detect an "Ad collateral" based upon an image or scene generated from the camera 30. In this example the Ad collateral is a wall poster for a movie named "Disaster Movie". 42 corresponds to an original image, used as a key frame, taken by the camera 30. The image 42 is transmitted to the controller 20 for processing. The apparatus 10 is configured to automatically detect the Ad collateral 40 in the image 42 as indicated by block 44, and subsequently perform a function or operation based upon that Ad Collateral detection as indicated by block 46 in FIG. 5.

Features as described herein may be used with automatic detection of Ad collateral and visual content within an augmented reality view. Features may be used in an image recognition pipeline. Features may be used with a capability of detecting "Ad collateral" within a visual scene. Most visual scenes conduct analysis of the image or visual content without much information about heuristics relating to the content. In visual content recognition, the detection phase is an essential part of effective image recognition. A scene or image under analysis must have cues which aid in the detection of relevant visual content. An Ad collateral, for example, will be viewed in either a portrait or landscape mode. If this information is known, an algorithm can run at real time on a viewfinder or display of a device for an augmented reality view. This allows a user to be alerted of Ad collateral nearby (within the view of the viewfinder or display of the device).

Most visual scene analysis algorithms have predefined models or pre-trained models for detecting specific content (e.g. Viola-Jones for face detection). With features of an example as described herein, known heuristics may be fused with a biologically inspired algorithm which uses a visual attention model. Various different computational visual attention algorithms are known. With features of an example as described herein, if an Ad collateral is detected it can be correlated to a database of published projected Ads within a map database. This may be transformed from real world geo-coordinates into camera coordinates.

Most recognition algorithms rely on a pattern matching method for recognition; where detection is a component in the pipeline. This is inefficient because the user will be fully driving the user interface (UI). With features as described herein, augmented reality elements in an augmented reality view on a UI (such as augmented reality views provided with CITY LENS and LIVESIGHT for example) may have augmented reality elements with user proximity where they can visualize the elements in a cylindrical view. In this case, this localizes the user window to the line of sight or field of view as added support to existing UI views. With features of an example as described herein, inference (such as via sensors and a compass for example) may assist by informing the user of a nearby Ad collateral. This detection system may be independent of the coordinates of the Ad collateral, and can be used with or without the real world coordinates of the Ad collateral in a marker-less approach.

The detection algorithm may take into account a visual scene from a camera sensor. The scene may be analyzed in a number of ways. Each method used to analyze the scene may be computed using graphics programming for fast processing; e.g. field-programmable gate arrays (FPGAs) or general purpose graphics processing unit (GPU) for acceleration. The detection system can compute at high or low resolution, such as 1080p or 480p for example.

Figure 6:
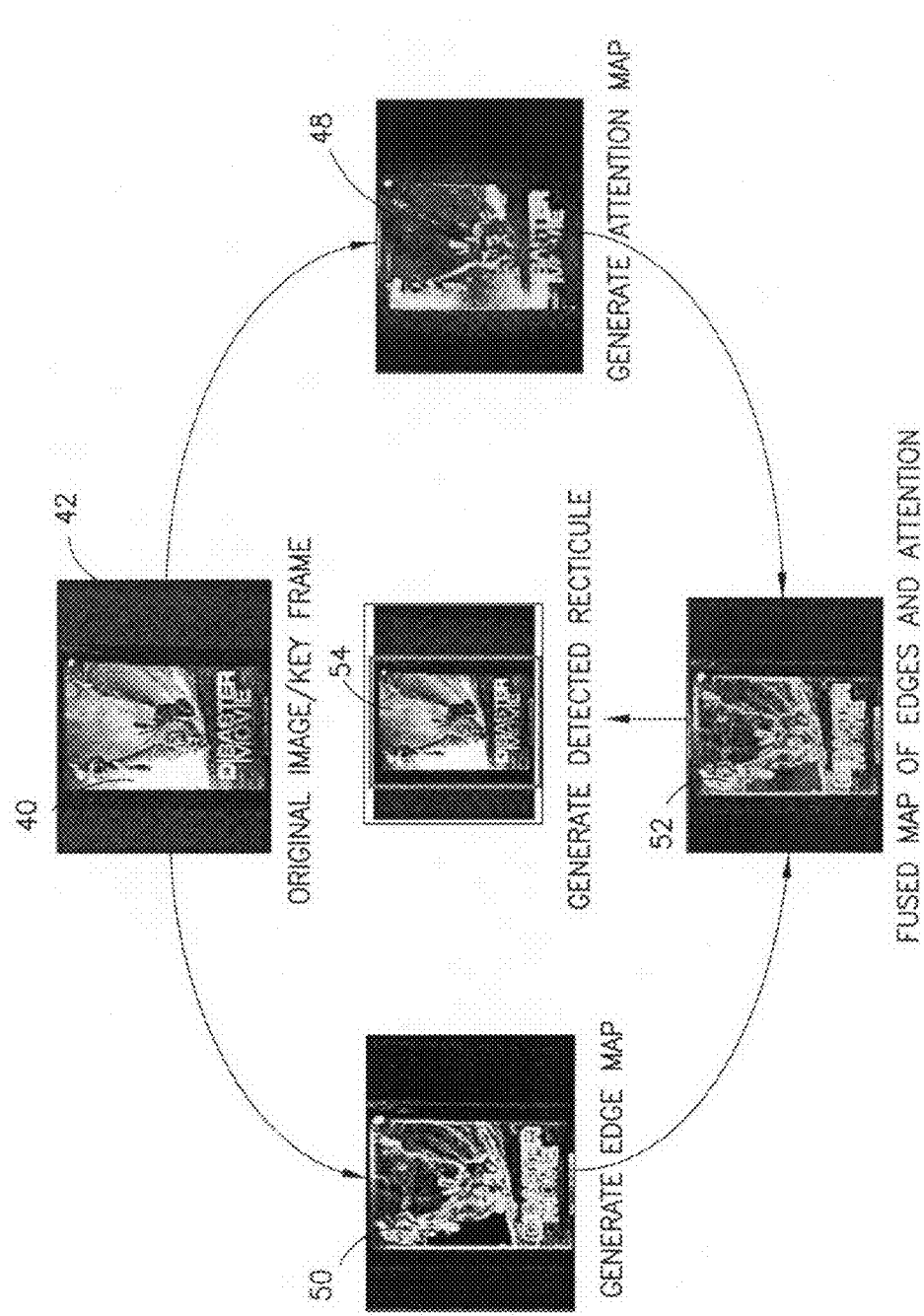
FIG. 6 is a diagram illustrating some steps of an example method.

In one example shown in FIG. 6, a biologically inspired algorithm, such as a visual attention map 48 for example, is generated from the image 42. An edge map 50 is also generated from the same image 42. The two maps 48, 50 are then fused as indicated by 52. Connected edges are derived which form a line or recticule (also known as a reticle or reticule) from the fuse. The recticule 54 may be traced on the viewfinder 15 or display 14, 14' based on the fused edge and attention maps, perhaps based on a thresholding scheme, and shown with the original image on the viewfinder or display at a same time. This recticule may be used by the user of the apparatus to immediately recognize that an Ad collateral is in the image shown in the viewfinder or display. The apparatus 10 is configured to automatically detect or discern an Ad collateral in an image or scene from the camera 30 and perhaps automatically perform at least one function, such as providing the recticule 54 on the viewfinder or display.

EXAMPLE IMPLEMENTATION

Figure 7:
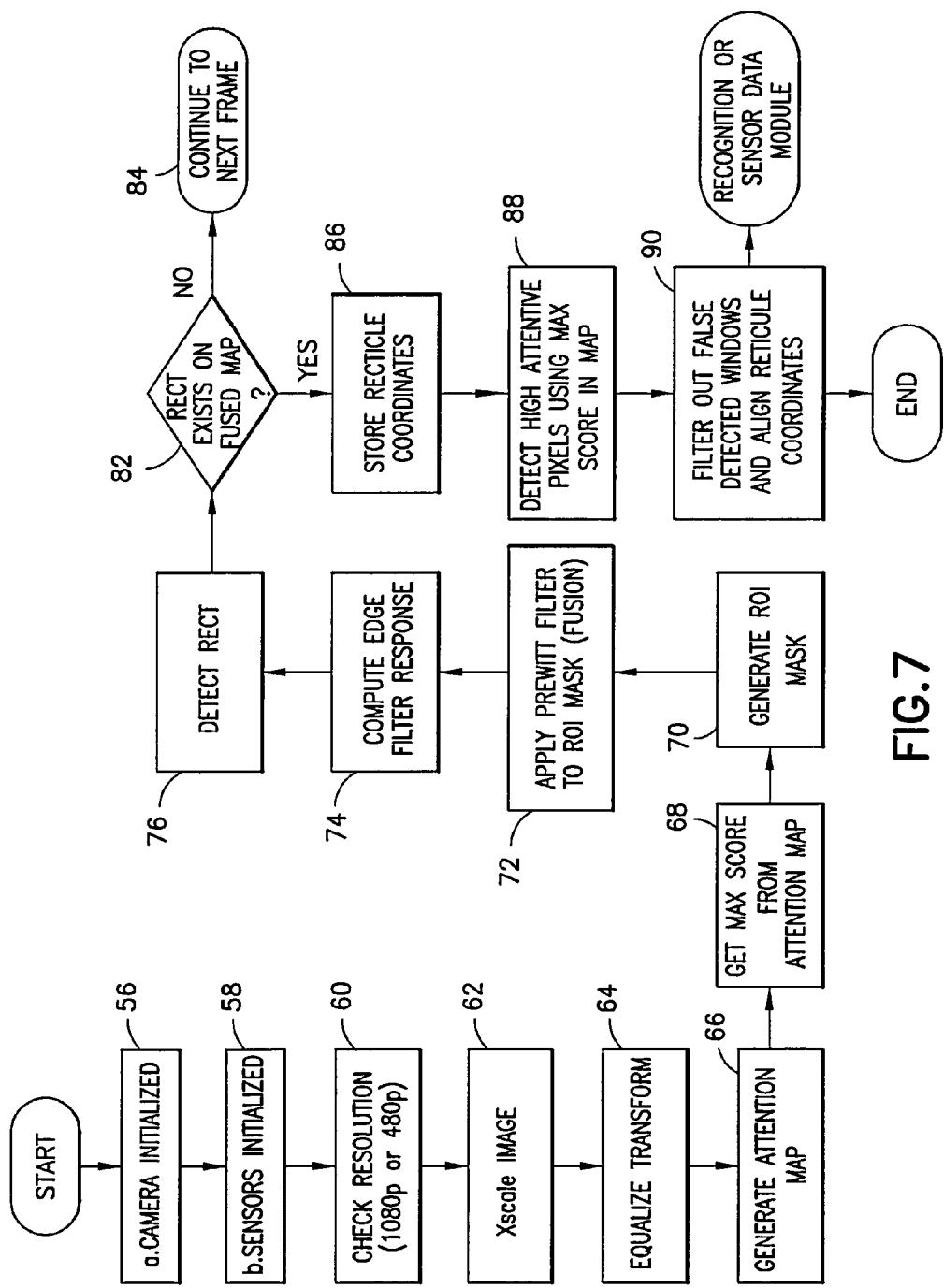
FIG. 7 is a diagram illustrating some steps of an example method.

Referring also to FIG. 7, one example method will be described.

At the start of this example method, the camera 30 is initialized as indicated by block 56 and the sensors are initialized as indicated by block 58. The sensors may include, for example, a compass and a GPS. Camera resolution may then be checked as indicated by block 60. This may include, for example, a test image or key frame from camera sensor 30 and a check of width and height of output from the camera. 1080p and 480p is shown as examples of resolution in FIG. 7, but any suitable resolutions could be provided.

As indicated by block 62, XScale may be used for an upscale or downscale by using scaling factor on pixel density. As indicated by block 64, an Equalize Transform and be used to:
  Convert the image to grey scale,
  Compute a histogram,
  Find head and tail of histogram, and equalize the histogram,
  Apply to pixels in the histogram, and
  Update the equalized image.

As indicated by block 66, an attention map may be generated, such as by using a known Stentiford's Visual Attention algorithm model for example. As indicated by blocks 68 and 70, the attention map may be used as a map score to compute the ROI (region of interest) mask. As indicated by blocks 72 and 74, the edge map may be generated using prewitt filter offsets for example, the edge map may be fused with the ROI mask, and the pixels in both the edge map response and ROI map may be fused into one (fused) map 52.

As indicated by block 76, the recticule 54 may then be determined or detected. This may comprise, for example:
  a. Set max for x1 and x2 (vertical points of map)
  b. Set max for y1 and y2 (horizontal points on map)
  c. Set y to half of height
  d. Get sum of edges horizontally and vertically across edge map
  e. Get sum of ROI pixels horizontally and vertically across ROI map
  f. Set Edge factor 1 and 2 to a value for horizontal and vertical strides
  g. Check if sum of edges in y direction is greater than Edge factor
  h. Set x to half of width, test for d and e noted above
  i. If sum of edges is less than minimum sum value found max of x1, check for all other axe points x2, y1 and y2.
  j. Define values for min. and max. crop ratios for width and height (such as 10, 90 for example)
  k. Find min. and max. for horizontal and vertical strides of the fused map
  l. Check to if the max. and min. of x and y are not width and height
  m. Verify cases of false recticules
  n. simple close up check, case one, large rect. close up do not crop
  o. simple close up check, case two, long width, short height—irregular do not crop The max. score may be used to remove low attention pixels. Re-run only process n-o for vertical and horizontal cases. The recticule may be drawn based on min. points for vertical and horizontal line, and also for maximum. The lines may be connected where x1, x2 and y1, y2 connect.

The line(s) or recticule may be drawn only around high attentive pixels in the fused edge and ROI map 52. The reticule may be converted on the camera to a camera coordinate in degree per pixel (dpp) using the camera field of view. The camera coordinate (Xdpp) can then be converted to real world coordinate (latitude/longitude) or, similarly, Xdpp can be compared to other Ad transformed real world coordinates (Ydpp). Ydpp can be estimated such as with an Ad collateral real world coordinates (latitude/longitude) transformed to camera coordinates.

As indicated by block 82, if the recticule 54 cannot be established on the fused map, the method can proceed to the next frame as indicated by 84. if the recticule 54 is established, the recticule coordinates may be stored as indicated by block 86. High attentive pixels may be detected using a max. score in the map as indicated by block 88. As indicated by block 90, false detected windows may be filtered out, and the recticule may be aligned to coordinates.

Any suitable type of alignment may be used. In one example alignment method, a compass-camera alignment algorithm may be used such as, for example:
 a. If Ydpp is within certain threshold,
 b. Threshold defined by error in compass (deviation error+/−n value) on device.
 c. Draw two Cell boxes (m×n) around Xdpp and Ydpp; where size of each is a function the error.
 d. Get the tangent angle between two points in dpp on the cylindrical model of the camera window.
 e. Compare actual value to estimate using error on compass. Check altitude info for Xdpp and Ydpp with reference to device location (x,y,z).
 f. If difference is within tolerance of error on compass (threshold)
 g. Align and back-propagate to sensor with new deviation value.
 h. Accuracy of compass is corrected.

Mathematical Model of RECTPOINT Spatial Reference Projection:

The actual projection of RECTPOINTs augmented onto the devices viewfinder or display screen can be accomplished in several ways. The Model Space uses a virtual cylinder which is normalized from real world polar co-ordinates to Cartesian representation. The example model can be explained in n number of steps except for 2D and 3D layout scheme except some subtle difference:

Step 1—Map Projection

Real world physical geographic point of a (RECTPOINT), $$\lambda f, \phi f \square Pf \quad (1)$$

$$\lambda s, \phi s \square Ps \quad (2)$$

Where Ps (starting point) & Pf (destination point) of geographic coordinate containing a Longitude ( ) and Latitude ( )

$$(+) \text{ for } N\phi f \text{ or } E\phi f, $$

$$(-) \text{ for } S,\phi f \text{ or } W,\phi f \quad (3)$$

This specifies the East-West and North-South position of a point on the Earth's surface from the prime meridian. It is an angular measurement, usually expressed in Decimal Degree (radians) notation.

Step 2—Cylinder Projection

Figure 8:
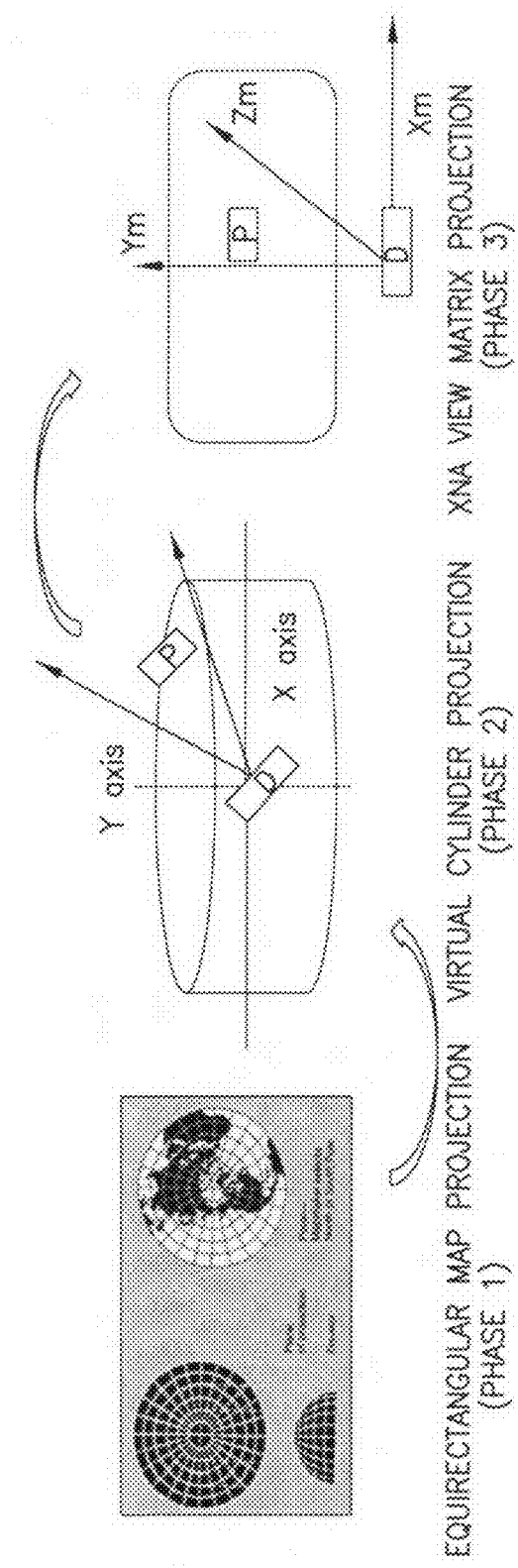
FIG. 8 is a diagram illustrating some steps of an example method.

In FIG. 8, the geographic point $P_f, P_s$ is converted into a 3D Cartesian coordinate system. Every point that is expressed in ellipsoidal coordinates can be expressed as an x y z (Cartesian) coordinate. A Microsoft GeoCoordinate API value exposed is based on the WGS84 standard to compute coordinates as follows;

$$Xm, Ym, \text{ and } Zm, \quad (4)$$

$$\Delta(\phi)=(\phi s-\phi f), \text{ difference between device and RECT-POINT longitude} \quad (5)$$

$$\Delta Xm: 0 \geq \Delta(\ ) \geq -\pi \text{ or } \Delta(\ ) \geq \pi, \Delta Xm \text{ is } (-) \text{ else } \Delta Xm(+) \quad (6)$$

distance between device latitude $\lambda_s$, RECTPOINT longitude $\phi_f$ in meters $$\Delta Ym: \alpha f-\alpha s \text{ if } (\alpha f \text{ or } \alpha s \neq NAN) \quad (7)$$

difference value btw RECTPOINT elevation $\alpha_f$, device elevation $\alpha_s$ in meters.

$$\Delta Zm: \lambda s-\phi f \text{ if } (\lambda s<\phi f), \Delta Zm \text{ is } (-) \text{ else } \Delta Zm(+), \quad (8)$$

difference value between RECTPOINT longitude $\phi_f$, device longitude $\phi_s$ in meters.

where m is measured in meters (metric) between Ps and Pf, this is the Azimuthal Equidistant map projection assumes some spatial variation, a flat plane projection of a relative geo-location on the earth with error of 0.5% for short distances and increase in error margin for long distance projections.

$$\square h \text{ device compass sensor heading} \quad (9)$$

$$\square A=ArcTan(Xm,Zm), \text{ where } A \text{ is the bearing with reference to North.} \quad (10)$$

$$Dfs, \text{ Distance between device geo-location } (Ps) \text{ and RECTPOINT geo-location } (Pf) \quad (11)$$

Figure 9:
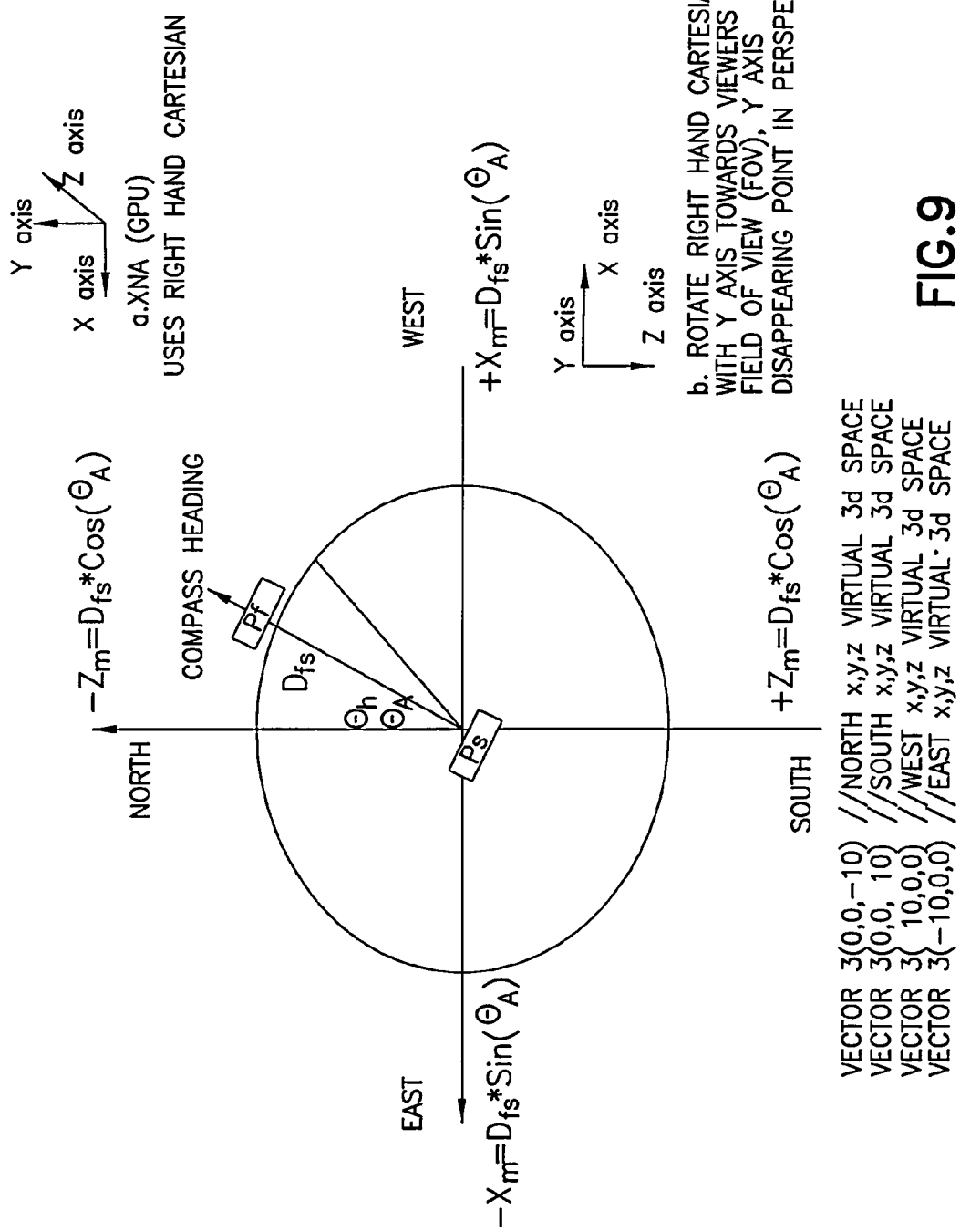
FIG. 9 is a diagram illustrating use of a compass heading.

Coordinates in this space assumes right hand rule of a Cartesian coordinate system in FIG. 9. This proposal is to use XNA transformation matrices. However, these matrices work on a standard 3D coordinate system, which is called the Model Space. We'll label coordinates in this space, Xm, Ym, and Zm.

Xm and Zm values (the horizontal plane) are used and always lie on the circle described by the cylinder. If the angle and height on the cylinder are $\square A$ and Dfs, then we use the following transforms to get to the Model Space, see FIG. 9:

$$Xm=Dfs*\sin(\square A) \quad (12)$$

$$Zm=Dfs*\cos(\square A) \quad (13)$$

$$Ym=Hc*Sn \quad (14)$$

This can be used to displace RECTPOINT (Pf) horizontally in the 3D Cartesian system. Equations (13-14) are used only for horizontal deoverlap. Note that each RECTPOINT has its own Xm, Ym, and Zm. These are recomputed for each "large" or "small" move after the grid layout algorithm is applied.

The trigonometric functions are Sin=Opposite/Hypotenuse, Cosine=Adjacent/Hypotenuse. Our hypotenuse is always 1 because we are using a unit cylinder. All angles are measured from North, not from the preceding axis.

Hc is the vertical band of graphical item within the ViewfinderWidth of the screen display in 2D view.

$$Hc=\text{ViewfinderWidth}*Sn \quad (15)$$

where row height is the vertical height of the row in pixels (such as 80 for example). The viewfinder resolution should support WVGA (800×480), WXGA1(1280×720) and WXGA2(1280×768) modes.

ViewFinderWidth is the width of the camera viewfinder.

ViewFinderHeight is the height of the camera viewfinder.

Field of view (FOV) is the angle which describes the extent of the observable world that is seen at any given moment in the viewfinder.

$$FOVh=(ViewFinderHeight/ViewFinderWidth)*Horizontal\ camera\ angle\ of\ view\ (HAOV) \quad (16)$$

$$FOVv=(ViewFinderHeight/ViewFinderWidth)*Vertical\ camera\ angle\ of\ view\ (VAOV) \quad (17)$$

Viewport is the window dimensions of a render-target surface onto which a 3D volume projection.

Aspect ratio of an image describes the proportional relationship between its viewfinderwidth and its viewfinderheight.

Horizontal DegreePerPixel (Dpp) or Pixel per Degree is the width of the viewfinder normalized by the horizontal camera angle of view assuming landscape mode.

$$H\ DegreePerPixel=viewFinderWidth/HAOV \quad (18)$$

$$V\ DegreePerPixel=viewFinderHeight/VAOV \quad (19)$$

$$Pix\ W\square = ViewFinderWidth*H\ DegreePerPixel \quad (20)$$

$$PixH\square = ViewFinderWidth*V\ DegreePerPixel \quad (21)$$

ViewFinderinAngle (PixW☐) is the width of camera viewfinder in degrees.

RECTPOINTHeight is the height of the RECTPOINT item on rowheight on the viewfinder resolution in landscape mode.

RECTPOINTWidthinPixel is the width of the RECTPOINT item relative to the viewfinder screen resolution.

RECTPOINTWidthinAngle is the angular width of the RECTPOINT item relative to the horizontal field of view.

$$RECTPOINTWidthinAngle=RECTPOINTWidthinPixel*Dpp \quad (22)$$

$$The\ formula\ for\ calculating\ the\ circumference\ of\ a\ sphere\ is\ 2*\pi*r \quad (23)$$

Where r is the radius of the Earth; about 6,378 km). The range of Zm is from 0 to half of the circumference of the earth; about 20,015 km. The maximum range of Zm=FarDistantPlane.

Features as described herein may provide automatic detection of Ad collateral, draw recticule on camera coordinate, provide real time alignment of detected recticule to an Ad RectPoint from the sensor, and allow pattern matching method to identify similar Ad in a database.

Figure 10:
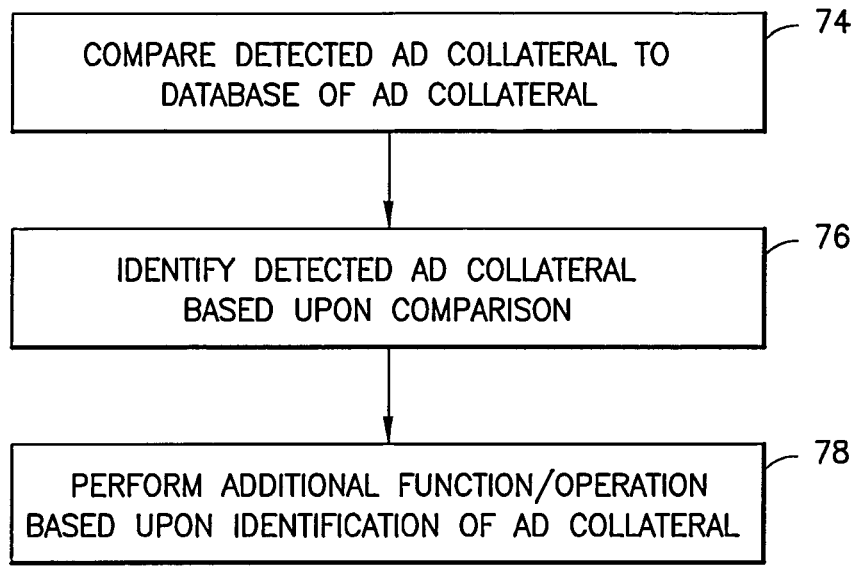
FIG. 10 is a diagram illustrating some steps of an example method.
Figure 11:
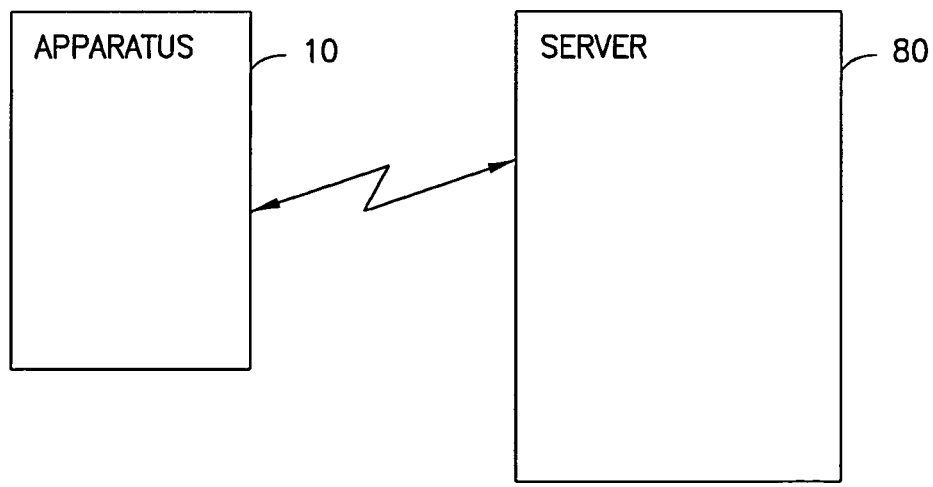
FIG. 11 is a diagram illustrating connection of the apparatus to another device.

As noted above with regard to FIG. 5, the apparatus 10 is configured to perform 46 a function or operation based upon detection of the Ad Collateral 40. This operation may comprise, for example, recording the location of the Ad collateral as metadata in an updated electronic file of the image, and/or transmitting the location of the Ad collateral in a wireless signal from the apparatus 10. Referring also to FIG. 10, in one example the function or operation 46 based upon detection of the Ad Collateral 40 may comprise comparing the detected Ad Collateral 40 to a database of Ad Collateral as indicated by block 74. This comparison may be done to identify the detected Ad collateral as a specific individual identified Ad collateral as indicated by block 76; thereby identifying content of the Ad collateral. Based upon the identification, the apparatus may be configured to then perform 78 another function or operation, such as recording the identity of the Ad collateral in the metadata, obtaining further information (such as by downloading from a remote location or server) specific to the identified Ad collateral, and/or transmitting the identity and location of the Ad collateral from the apparatus 10 to another device 80 as exemplified by FIG. 11.

These are only examples and should not be considered as being limiting. The database may be in the memory 24 for example, and/or may be in a server remote from the apparatus 10. Identification of the Ad collateral may or may not comprise use of a barcode, such as a QR code or 2D matrix bar code for example. In one example embodiment the detection or discerning of the existence of the Ad collateral in a scene or image may comprise identification of the Ad collateral for the detection. However, identification of specific content of the Ad collateral may occur later as noted above.

In one example, when the scene 42 is viewed by the camera 30, the recticule 54 may be formed and the image may be saved by the user (such as by taking the picture). The user may then be able to use the touchscreen to select the Ad collateral and the apparatus 10 may be able to access the server 80 to get geo-coordinate location dependent information and/or other information relating to the Ad collateral. For example, the geo-coordinate location dependent information may comprise showtimes for the movie "Disaster Movie" at local movie theater(s) and location of the local movie theater(s) relative to the apparatus 10. Other information relating to the Ad collateral may comprise, for example, an age rating for the movie, critic reviews of the movie, actor names, plot description, etc. This is merely one example and should not be considered as limiting.

In another example the location of the Ad collateral relative to the apparatus 10 may be downloaded by the server 80 to the apparatus 10 such that the apparatus 10 may find the Ad collateral faster in the viewfinder or display by moving the apparatus' field of view to the direction of the location of the Ad collateral.

In one example embodiment a method may be provided comprising transmitting an image 42 from a camera 30 of an apparatus 10, where the image comprises one or more Ad collateral 40; and automatically detecting 44 by the apparatus 10 at least one of the Ad collateral in the image. The method may further comprise drawing at least one recticule based upon the detecting of the Ad collateral. The method may further comprise providing the recticule on a display or a view finder of the apparatus. The method may further comprise aligning the recticule relative to the Ad collateral. The method may further comprise comparing the at least one Ad collateral to Ad collaterals stored in a memory. Detecting the at least one Ad collateral may comprise generating a visual attention map based upon the image, generating an edge map based upon the image, fusing the visual attention map and the edge map, deriving connected edges from the fusing to form one or more lines, and tracing the one or more lines based on the fused edge and visual attention maps and a thresholding. The method may further comprise, based at least partially upon the detecting of the Ad collateral, identifying the Ad collateral to a user of the apparatus. The method may further comprise, based at least partially upon the detecting of the Ad collateral, receiving information by the apparatus relating to the Ad collateral. The method may further comprise, based upon the detecting of the Ad collateral, performing at least one function by the apparatus based, at least partially, upon coordinates of the camera and/or the Ad collateral.

In one type of example embodiment an apparatus may be provided comprising at least one processor; and at least one memory including computer program code, the at least one memory and the computer program code configured to, with the at least one processor, cause the apparatus at least to automatically discern at least one Ad collateral in a camera image.

The at least one memory and the computer program code may be configured to, with the at least one processor, cause the apparatus to at least partially identify the Ad collateral. The at least one memory and the computer program code may be configured to, with the at least one processor, cause the apparatus to automatically detect the at least one Ad collateral in the camera image. The at least one memory and the computer program code may be configured to, with the at least one processor, cause the apparatus to draw at least one recticule based upon the discerning of the Ad collateral. The at least one memory and the computer program code may be configured to, with the at least one processor, cause the apparatus to provide the recticule on a display or a view finder of the apparatus. The at least one memory and the computer program code may be configured to, with the at least one processor, cause the apparatus to align the recticule relative to the Ad collateral. The at least one memory and the computer program code may be configured to, with the at least one processor, cause the apparatus to compare the at least one Ad collateral to Ad collaterals stored in a memory. Discerning the at least one Ad collateral may comprise generating a visual attention map based upon the camera image, generating an edge map based upon the camera image, fusing the visual attention map and the edge map, deriving connected edges from the fusing to form one or more lines, and tracing the one or more lines based on the fused edge and visual attention maps and a thresholding. The at least one memory and the computer program code may be configured to, with the at least one processor, cause the apparatus to, based upon the discerning of the Ad collateral, perform at least one function by the apparatus based, at least partially, upon coordinates of the apparatus and/or the Ad collateral. The apparatus may comprise means for automatically detecting by the apparatus the at least one of the Ad collateral in the camera image.

In another example embodiment a non-transitory program storage device readable by a machine may be provided, tangibly embodying a program of instructions executable by the machine for performing operations, the operations comprising: analyze an image from a camera, where the image comprises one or more Ad collateral; and automatically discern at least one of the Ad collateral in the image.

As noted above, Ad collateral may comprise text, an image, a combination of text and image(s), and perhaps also a bar code such as a QR code for example. "Ad collateral" always comprises more than merely a bar code, and will always comprise text and/or a non-bar code image. As used herein, detecting the Ad collateral is based upon not using bar code information. While other approaches detect text in a visual scene for processing within an OCR engine, features as described herein may use text which exists in a real world scene (such as an Ad poster at a bus stop for example); where a bar code may or may not be present in the Ad poster. The detection is independent of bar code information (which may or may not be present). Visual clues may be used, such as facial clues and/or stylized imagery or layout of text in the Ad poster, for example, to detect and identify the Ad poster.

In an alternate example embodiment the visual attention map may be replaced with any other biologically inspired algorithm that identifies salient cues in a scene. For example with direct approach for visual attention maps, there are other attentional models, such as bottom up itti and Koch models. This differs in approach to a Stentiford's model of attention.

So the attention map can be generated in any of these approaches. In one example embodiment a Stentiford's model is used.

Examples of algorithms used in computer vision to generate interest points include Scale-invariant feature transform (SIFT), Speeded Up Robust Features (SURF) and Gradient location-orientation histogram (GLOH). Algorithms can be used to give attentional maps interest points locality in a visual scene for example. Saliency or attentional maps may be generated through a direct approach algorithm of computational attention or using interest points to localize where visual cues exists in spatial domain in a visual scene. Keypoint localization may be used to create the fused map.

In one example embodiment features may include the addition of a level of parallelism using a heterogeneous computing platform. However, such an additional level is not required.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
transmitting an image from a camera of an apparatus, where the image comprises at least one Ad collateral; and
automatically detecting by the apparatus the at least one Ad collateral in the image, where detecting the at least one Ad collateral comprises
generating a visual attention map based upon the image,
generating an edge map based upon the image,
fusing the visual attention map and the edge map,
deriving connected edges from the fusing to form one or more lines, and
tracing the one or more lines based on the fused edge and visual attention maps, and a thresholding scheme.

2. The method as in claim 1 further comprising drawing at least one recticule based upon the detecting of the at least one Ad collateral.

3. The method as in claim 2 further comprising providing the at least one recticule on a display or a view finder of the apparatus.

4. The method as in claim 3 further comprising aligning the at least one recticule relative to an Ad collateral of the at least one Ad collateral.

5. The method as in claim 1 further comprising comparing the at least one Ad collateral to Ad collaterals stored in a memory.

6. The method as in claim 1 where the fusing comprises fusing known heuristics of the visual attention map and the edge map with a biologically inspired algorithm which uses a visual attention model.

7. The method as in claim 1 further comprising, based at least partially upon the detecting of the at least one Ad collateral, identifying the at least one Ad collateral to a user of the apparatus.

8. The method as in claim 1 further comprising, based at least partially upon the detecting of the at least one Ad collateral, receiving information by the apparatus relating to the at least one Ad collateral.

9. The method as in claim 1 further comprising, based upon the detecting of the at least one Ad collateral, performing at least one function by the apparatus based, at least partially, upon coordinates of at least one of the camera and the at least one Ad collateral.

10. An apparatus comprising
at least one processor; and
at least one memory including computer program code,
the at least one memory and the computer program code configured to, with the at least one processor, cause the apparatus at least to:
automatically discern at least one Ad collateral in a camera image, where discerning the at least one Ad collateral comprises
generating a visual attention map based upon the camera image,
generating an edge map based upon the camera image,
fusing the visual attention map and the edge map,
deriving connected edges from the fusing to form one or more lines, and
tracing the one or more lines based on the fused edge and visual attention maps, and a thresholding.

11. The apparatus as in claim 10 where the at least one memory and the computer program code are configured to, with the at least one processor, cause the apparatus to at least partially identify the at least one Ad collateral.

12. The apparatus as in claim 10 where the at least one memory and the computer program code are configured to, with the at least one processor, cause the apparatus to automatically detect the at least one Ad collateral in the camera image.

13. The apparatus as in claim 10 where the at least one memory and the computer program code are configured to, with the at least one processor, cause the apparatus to draw at least one recticule based upon the discerning of the at least one Ad collateral.

14. The apparatus as in claim 13 where the at least one memory and the computer program code are configured to, with the at least one processor, cause the apparatus to provide the at least one recticule on a display or a view finder of the apparatus.

15. The apparatus as in claim 13 where the at least one memory and the computer program code are configured to, with the at least one processor, cause the apparatus to align the at least one recticule relative to an Ad collateral of the at least one Ad collateral.

16. The apparatus as in claim 10 where the at least one memory and the computer program code are configured to, with the at least one processor, cause the apparatus to compare the at least one Ad collateral to Ad collaterals stored in a memory.

17. The apparatus as in claim 10 where the fusing comprises fusing known heuristics of the visual attention map and the edge map with a biologically inspired algorithm which uses a visual attention model.

18. The apparatus as in claim 10 where the at least one memory and the computer program code are configured to, with the at least one processor, cause the apparatus to, based upon the discerning of the at least one Ad collateral, perform at least one function by the apparatus based, at least partially, upon coordinates of at lest one of the apparatus and the at least one Ad collateral.

19. The apparatus as in claim 10 comprising means for automatically detecting by the apparatus the at least one of the at least one Ad collateral in the camera image.

20. A non-transitory program storage device readable by a machine, tangibly embodying a program of instructions executable by the machine for performing operations, the operations comprising:
analyze an image from a camera, where the image comprises one or more Ad collateral; and
automatically discern at least one of the Ad collateral in the image, where discerning the at least one Ad collateral comprises
generating a visual attention map based upon the camera image,
generating an edge map based upon the camera image,
fusing the visual attention map and the edge map,
deriving connected edges from the fusing to form one or more lines, and
tracing the one or more lines based on the fused edge and visual attention maps, and a thresholding.

* * * * *